UNITED STATES PATENT OFFICE.

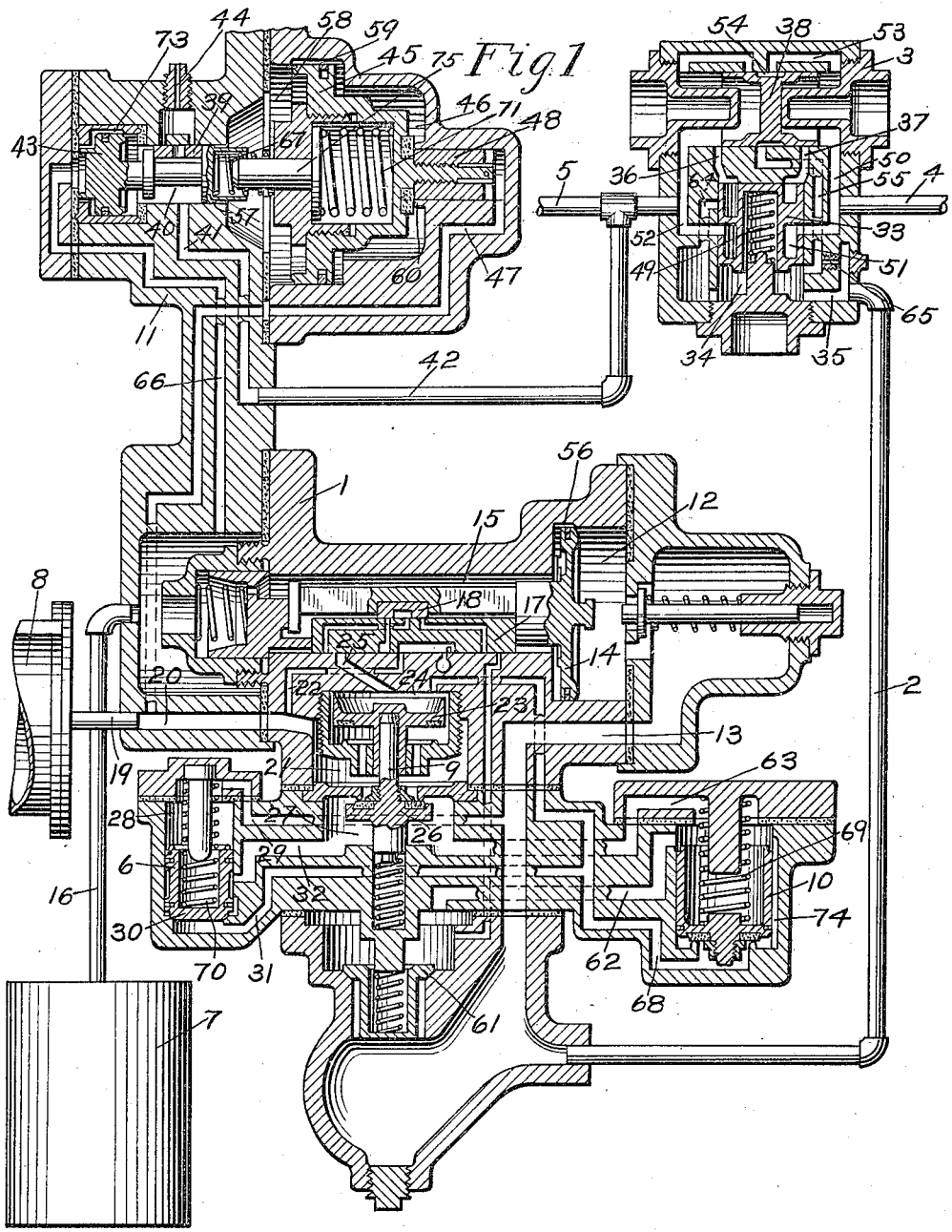

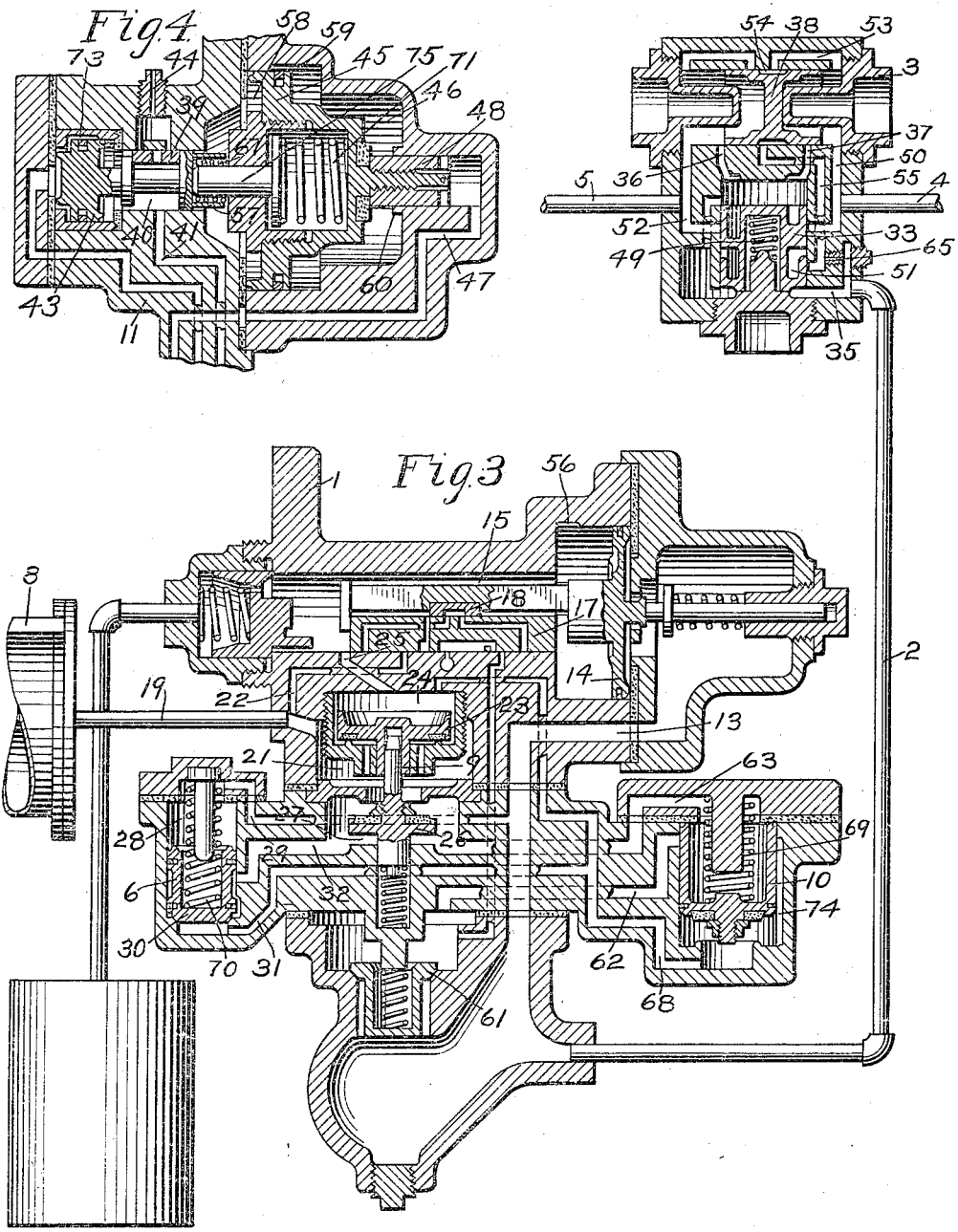

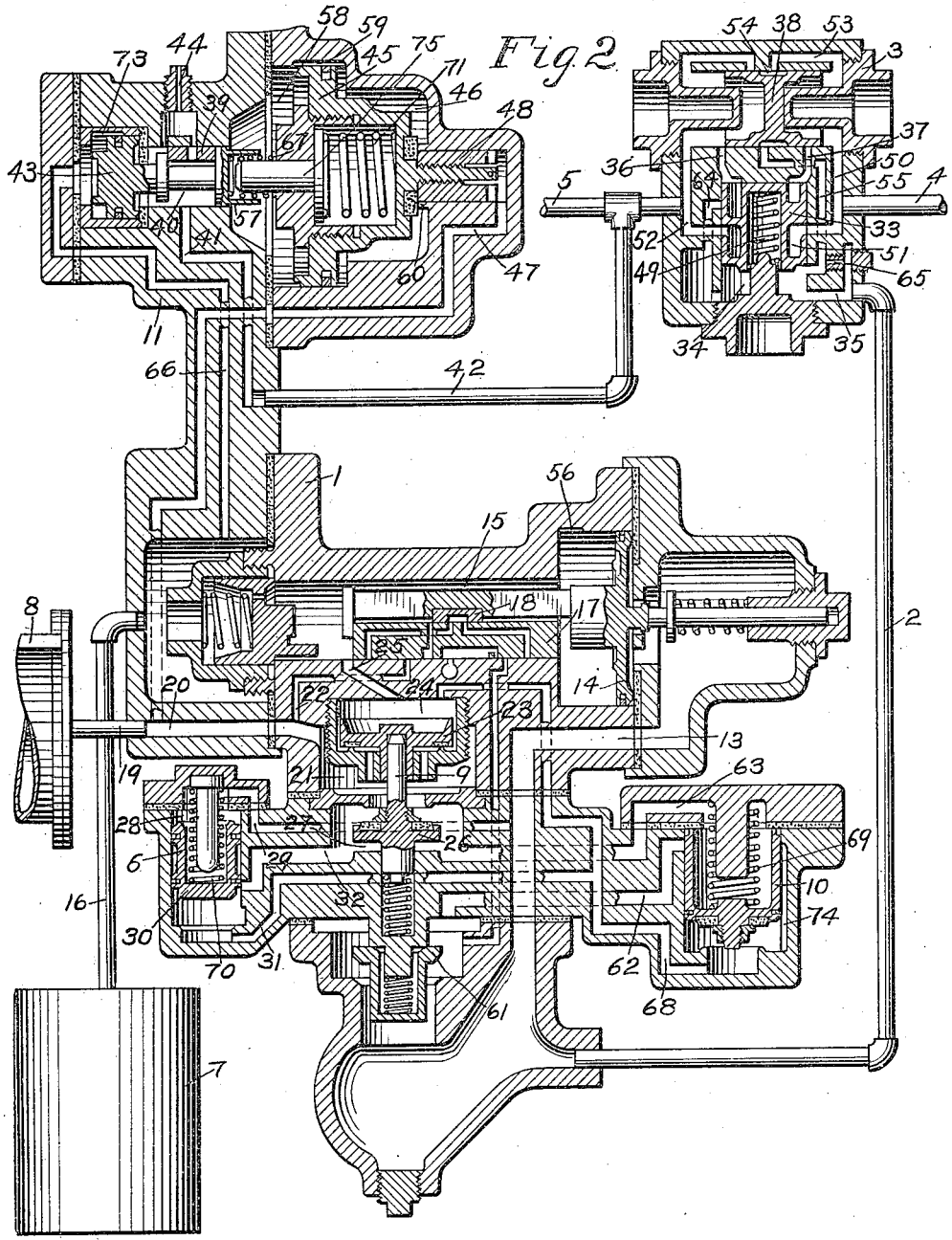

WALTER V. TURNER, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

FLUID-PRESSURE BRAKE APPARATUS.

1,278,524.   Specification of Letters Patent.   Patented Sept. 10, 1918.

Application filed June 4, 1915. Serial No. 32,077.

*To all whom it may concern:*

Be it known that I, WALTER V. TURNER, a citizen of the United States, residing at Edgewood, in the county of Allegheny and State of Pennsylvania, have invented new and useful Improvements in Fluid-Pressure Brake Apparatus, of which the following is a specification.

This invention relates to fluid pressure brakes, and more particularly to a brake equipment having means for securing an emergency application of the brakes upon a sudden reduction in brake pipe pressure.

With the constantly increasing length of trains, it has been found difficult to effect an emergency application of the brakes without causing the slack to run in so as to cause dangerous shocks and internal collisions, on account of the brakes applying at the head end of the train before they are applied at the rear end. If the train is not too long, the well known quick serial action feature will propagate the braking action through the train at a sufficiently rapid rate, but it is highly desirable to provide a brake equipment which will operate to effect a more nearly simultaneous application of the brakes throughout the train in an emergency application and the principal object of my invention is to accomplish this purpose.

In the accompanying drawings; Figure 1 is a central sectional view of a fluid pressure brake equipment embodying my invention as applied to the caboose or rear car, showing the parts in normal release position; Fig. 2 a similar view, showing the parts in emergency application position; Fig. 3 a central sectional view of a fluid pressure brake equipment embodying my invention as applied to cars other than the caboose or rear car, showing the parts in emergency application position; and Fig. 4 a central sectional view of the rear car brake pipe vent valve device, showing the parts in position, when the brake pipe vent is closed.

According to a preferred form of my invention, a triple valve device 1 is provided having branch pipe 2 connected to a brake pipe cut off valve device 3 which controls communication from that portion of the brake pipe leading to the brake valve to that portion leading to the rear of the train. In describing the operation of the apparatus, it will be assumed that the brake pipe portion 4 leads to the brake valve and the portion 5 to the rear of the train.

Each triple valve device has associated therewith an auxiliary reservoir hold back valve device 6 for controlling the flow of fluid from the auxiliary reservoir 7 to the brake cylinder 8, a quick action valve device 9, and a brake pipe reduction limiting valve 10.

On the caboose or rear car of the train, an additional brake pipe vent valve device 11 is employed which may be secured to the auxiliary reservoir side of the triple valve device 1.

The triple valve device 1 may be of the usual construction having a piston chamber 12 connected by passage 13 with brake pipe branch pipe 2 and containing piston 14, and having valve chamber 15 connected by pipe 16 to auxiliary reservoir 7, and containing main slide valve 17 and graduating valve 18, adapted to be operated by piston 14.

Brake cylinder 8 is connected by pipe 19 and passage 20 to a chamber 21 from which fluid is supplied to the brake cylinder in an emergency application of the brakes and a service application and release passage 22, leads from passage 20 to the seat of slide valve 17.

The quick action valve device 9 comprises a piston 23 contained in piston chamber 24, having a passage 25 leading to the seat of slide valve 17, and a valve 26 contained in valve chamber 27 and adapted to be operated by piston 23.

The auxiliary reservoir hold back valve device 6 may be in the form of a valve piston having the chamber 28 at one side open through passage 29 to brake pipe passage 13 and having a valve 30 for controlling communication from passage 31 to passage 32.

The brake pipe cut off valve device 3 may comprise a piston 33 having chamber 34 at one side open through passage 35 to branch pipe 2 and having passages 36 and 37 leading from the chamber at the opposite side and controlled by a double check valve 38.

The brake pipe vent valve device 11 applied to the caboose or rear car may comprise a slide valve 39 contained in valve chamber 40 which is connected by passage 41 and pipe 42 to brake pipe 5 and a double seating piston 43 for actuating said valve to open communication from the brake pipe to an atmospheric vent port 44.

In order to close the vent valve 39 when the brake cylinder pressure has been built up to a predetermined degree, a cut off piston 45 is provided, having chamber 46 at one side. A passage 47 opens back of a guide stem 48 carried by the piston 45, but since this stem is loose fitting in its chamber, fluid from the brake cylinder can readily flow past the stem to the chamber 46, when the piston is unseated.

In operation, when the brake pipe is charged with fluid under pressure, fluid flows to the cut-off valve device 3 on the first car through brake pipe portion 4, said portion being at the brake valve side. The piston 33 is normally held in the position shown in Fig. 1 by spring 49, so that communication is open, in this position, from pipe 4 through passage 50 and annular cavity 51 in piston 33 to passage 52 leading to brake pipe portion 5. Fluid can therefore flow through the cut-off valve device 3 on the first car to the next car and in a similar manner through the succeeding cut-off valves to the rear of the train. Fluid also flows from passage 50 to the right hand chamber of the double check valve 38 and thence through a passage 53 and an annular cavity 54 in the double check valve to passage 55 which is now open to chamber 34. Thence fluid is supplied through passage 35 and pipe 2 to the triple valve piston chamber 12 and through the usual feed groove 56, to the valve chamber 15 and the auxiliary reservoir 7, charging same with fluid under pressure.

On the caboose or rear car, fluid flows from pipe 42 through passage 41 to valve chamber 40 of the brake pipe vent valve device 11 and from valve chamber 40, air flows around the loose fitting guide stem 57 of piston 43 to chamber 58 at one side of piston 45. From chamber 58 fluid equalizes through a feed groove 59 around piston 45 to chamber 46. Since the outer face of the stem 48 is subject to brake cylinder pressure, there will normally be an unbalanced pressure acting on piston 45 which operates to maintain the piston on its seat 60.

When a gradual reduction in brake pipe pressure is made to effect a service application of the brakes, the brake pipe pressure on the triple valve pistons is reduced in the usual manner without effecting the movement of the cut-off valve devices, and the triple valve piston 14 moving to service position connects the service passage 22 with the auxiliary reservoir, so that the brakes are applied in service in the ordinary way.

Upon a sudden reduction in brake pipe pressure to effect an emergency application of the brakes, the rapid fall in brake pipe pressure is communicated to the triple valve piston 14 on the first car of the train and this causes the movement of the triple valve parts to emergency application position, as shown in Fig. 3.

In this position, fluid from the auxiliary reservoir is supplied through passage 25 to quick action piston chamber 24 and piston 23 is thereupon actuated to open the vent valve 26 and thus permit fluid to be vented from branch pipe 2 past the usual quick action check valve 61, through passage 62 to passage 63, the limiting valve device 10 being now in open position, to valve chamber 27, and thence around the open vent valve 26 to chamber 21 and the brake cylinder.

The rapid reduction in pressure thus produced in branch pipe 2 is communicated to piston chamber 34 of the cut-off valve device. Meanwhile, the double check valve 38 has been shifted to the right, if not already in that position, by the more rapid reduction in pressure in the chamber at the right of the double check valve, which is open to the brake valve side of the brake pipe, so that passage 36 is open to the chamber at the left of the double check valve and consequently to the pressure in the brake pipe at the rear of the train. The higher pressure acting above the piston 33 therefore operates to shift same to its lower position, cutting off communication through the cavity 51. Fluid can still flow from the brake pipe portion 5 at the rear to the brake pipe portion 4, but only through restricted passages, the flow being from passage 52 to passage 36, through a passage 64 to chamber 34 and thence through passage 35 and a restricted port 65 to passage 55 which communicates with pipe 4 through cavity 54, passage 53, and passage 50.

As quick action travels through the train from the first car, the cut-off pistons 33 will be successively shifted to the cut-off position, but these pistons will return to normal position as soon as the vent valve in the triple valve device closes, so that only the cut-off piston nearest the brake valve will remain in the cut-off position, due to the continued rapid reduction in pressure at the brake valve, as long as the brake valve remains in emergency position.

When quick action has traveled through the train to the caboose or rear car and the brake pipe pressure has thus been reduced to a predetermined degree, auxiliary reservoir pressure, which is supplied to the piston 43 through passage 66 and acts on a seated area thereof, is sufficient to overcome the brake pipe pressure acting on the opposite side of the piston together with the resistance of spring 67, and the piston 43 is then shifted to its brake pipe seat. In order to prevent possible building up of pressure from the auxiliary reservoir by leakage past the auxiliary reservoir seat, a leakage groove 73 may be provided around the piston, which is open in the auxiliary reservoir seated position, to permit any leakage of fluid to flow to the brake pipe side of the piston.

The movement of the piston 43 opens the vent valve 39 so that fluid is vented from the brake pipe to the atmosphere through port 44. By this means fluid is vented from the brake pipe at the rear end of the train as well as at the brake valve and the effect is the same as though a brake valve were located at each end of the train.

When the brake pipe pressure has been reduced to a predetermined degree, fluid at auxiliary reservoir pressure, which is admitted through a passage 68 to the seated area of the limiting valve device 10, is sufficient to overcome brake pipe pressure acting on the opposite side in conjunction with the spring 69, the unexposed lower area of the limiting valve being subject to brake pipe pressure admitted thereto through groove 74.

As soon as the valve 10 is lifted from its seat by auxiliary reservoir pressure, the full area is exposed to auxiliary reservoir pressure and the prompt movement of same to its upper position is effected. In this position, as shown in Fig. 4, communication is cut off from passage 62 to passage 63, so that further venting of fluid from the brake pipe is prevented.

When the brake pipe pressure has been reduced to a predetermined degree, preferably somewhat lower than the degree at which the limiting valve closes, the auxiliary reservoir hold back valve device 6 is operated by auxiliary reservoir pressure supplied through passage 31 to the seated area of the valve 30, and communication is opened, as shown in Fig. 2, from passage 31 to passage 32, so that fluid from the auxiliary reservoir is now supplied to the brake cylinder. The design of the hold back valve device is such that the communicating passage 32 will be opened just sufficiently to permit fluid to flow to the brake cylinder at the same rate as the brake pipe pressure is reducing. When the auxiliary reservoir and brake cylinder have equalized, the hold back valve will be returned to the closed position by the spring 70.

While the brake pipe pressure is being reduced by the operation of the vent valve device 11, the opposing pressures in chambers 58 and 46 are kept equal through the equalizing groove 59, but as the brake cylinder pressure builds up, a point is reached when the brake cylinder pressure acting on the exposed seated area of the piston 45 at the seat 60 is sufficient to overcome the opposing brake pipe pressure acting on a corresponding area of piston 45. The piston then moves from its seat 60, closing the groove 59 and permitting fluid at brake cylinder pressure to flow into chamber 46. This causes the further and prompt movement of the piston to its opposite seat and with it, the movable stem 75 which engages the guide 57 of piston 43 and consequently shifts said piston to its auxiliary reservoir seat, thus cutting off the further venting of fluid from the brake pipe. In order to insure the seating of both pistons 43 and 45, the stem 75 preferably has a movement relative to the piston 45 and is acted upon by a very stiff spring 71 which is powerful enough to shift the piston 43 to its auxiliary reservoir seat.

As will now be evident, the above described apparatus operates in an emergency application of the brakes to limit or restrict the rate of reduction in brake pipe pressure at the head end of the train or wherever the sudden reduction is initiated, while as soon as quick action is propagated through the train, a brake pipe vent is opened at the rear end so as to effect a rapid reduction in brake pipe pressure which will travel from the rear toward the front of the train. The limitation of the rate of brake pipe reduction at the head end of the train is preferably such that by reducing the brake pipe pressure at a greater rate at the rear end of the train through the operation of the caboose vent valve, the brake pipe pressure will be reduced to the degree at which the auxiliary reservoir hold back valves open, at substantially the same time on the cars at the front and rear ends of the train. Then from both the front and rear, the hold back valves are operated successively toward the middle portion of the train.

By this means a more nearly simultaneous application of the brakes is secured, and the possibility of producing dangerous shocks by the running in of the slack is avoided.

If a car is turned so that the brake pipe portion 5 is adjacent the brake valve, then upon a sudden reduction in brake pipe pressure, the double check valve 38 will be moved to the left, opening the passage 37 and thus permitting fluid from the brake pipe at the rear of the train to act on the piston 33.

Having now described my invention, what I claim as new and desire to secure by Letters Patent, is:

1. In a fluid pressure brake, the combination with a brake pipe and means operated upon a sudden reduction in brake pipe pressure for effecting a local reduction in brake pipe pressure, of a valve device located on the rear car of the train for also effecting a reduction in brake pipe pressure and means operated by the sudden reduction in brake pipe pressure for restricting the flow through the brake pipe to the point at which the sudden reduction is made.

2. In a fluid pressure brake, the combination with a brake pipe and means on each car of the train for effecting a local reduction in brake pipe pressure upon the initiation of a sudden reduction in brake pipe pressure, of an additional valve device located only on the rear car of the train and operated upon a predetermined reduction in brake pipe pressure for also effecting a reduction in brake pipe pressure and means operated by the sudden reduction in brake pipe pressure for restricting communication through the brake pipe.

3. In a fluid pressure brake, the combination with a brake pipe and auxiliary reservoir, of a vent valve device located only on the rear car of a train and operated by auxiliary reservoir pressure upon a predetermined reduction in brake pipe pressure for effecting a reduction in brake pipe pressure.

4. In a fluid pressure brake, the combination with a brake pipe and auxiliary reservoir, of a vent valve device located only on the rear car of a train and subject to the opposing pressures of the auxiliary reservoir and brake pipe and adapted to be operated upon a reduction in brake pipe pressure for effecting a sudden reduction in brake pipe pressure at the rear end of the train.

5. In a fluid pressure brake, the combination with a brake pipe and auxiliary reservoir, of a vent valve device located only on the rear car of a train comprising a valve and a piston subject on one side to auxiliary reservoir pressure and on the opposite side to brake pipe pressure and the pressure of a spring and operated upon a reduction in brake pipe pressure initiated at another point in the train for effecting a sudden reduction in brake pipe pressure at the rear end of the train.

6. In a fluid pressure brake, the combination with a brake pipe, of a quick action valve mechanism operated by an initial sudden reduction in brake pipe pressure for effecting a local reduction in brake pipe pressure and means operated by the continued reduction in brake pipe pressure at the point of initiation for restricting communication from the brake pipe to said point.

7. In a fluid pressure brake, the combination with a brake pipe, of a quick action valve mechanism operated upon a sudden reduction in brake pipe pressure for effecting a local reduction in brake pipe pressure and means in the brake pipe normally providing communication through a large passage and operated upon a local reduction in brake pipe pressure for restricting said communication, said means being maintained in the position for restricting communication by the continued reduction in brake pipe pressure at the point of initiation.

8. In a fluid pressure brake, the combination with a brake pipe, of means interposed in the brake pipe and adapted to permit the propagation of quick action throughout the train, but operated by the continued reduction in brake pipe pressure at the point of initiation for restricting communication from the brake pipe to said point.

9. In a fluid pressure brake, the combination with a brake pipe, of a piston device normally providing communication through a large passage from the front to the rear portion of the brake pipe and operated by fluid from the rear portion upon a sudden reduction in brake pipe pressure for restricting communication from the rear to the front portion of the brake pipe, and a double check valve subject to the opposing pressures of the brake pipe at the front and rear and operated upon a sudden reduction in brake pipe pressure for admitting fluid from the rear portion of the brake pipe to said piston device.

10. In a fluid pressure brake, the combination with a brake pipe, of a piston device for controlling communication from the brake pipe section at the front of the train to the brake pipe section at the rear and subject on one side to the pressure of fluid in the rear brake pipe section and a quick action valve device operated upon a sudden reduction in brake pipe pressure for venting fluid from the opposite side of said valve device to operate same and thereby restrict communication between the two sections of brake pipe.

11. In a fluid pressure brake, the combination with a brake pipe, of a valve device associated with the brake pipe and operated upon a sudden reduction at the front end of the train for restricting communication through the brake pipe and a vent valve device located only at the rear end of the train and operated upon a reduction in brake pipe pressure for effecting a sudden reduction in brake pipe pressure.

12. In a fluid pressure brake, the combination with a brake pipe, of a quick action valve device located on each car of the train for effecting a local reduction in brake pipe pressure, a valve device in the brake pipe and operated upon a sudden reduction in brake pipe pressure at the front end of the train for restricting communication through the brake pipe, and a vent valve device located only on the rear car of the train and operated upon a reduction in brake pipe pressure for also venting fluid from the brake pipe.

13. In a fluid pressure brake, the combination with a brake pipe, of a quick action valve device located on each car of the train, a valve device controlling communication through the brake pipe and operated upon a sudden reduction in brake pipe pressure at the front end of the train for restricting communication between the front and the rear portions of the brake pipe, and a vent valve device located only on the rear car of the train and operated when quick action reaches the rear car for venting fluid from the brake pipe at a greater rate than fluid is being vented from the brake pipe at the front end of the train.

14. In a fluid pressure brake, the combination with a brake pipe, of a quick action valve device located on each car of the train, a valve device operated upon a sudden reduction in brake pipe pressure at the front end of the train for restricting communication from the front to the rear portion of the brake pipe, a vent valve device located only on the rear car of the train and operated when quick action reaches the rear car for venting fluid from the brake pipe at a greater rate than at the front end, and a valve device for supplying fluid to the brake cylinder upon a predetermined reduction in brake pipe pressure and at a rate corresponding with the rate of reduction in brake pipe pressure.

In testimony whereof I have hereunto set my hand.

WALTER V. TURNER.

Witnesses:
A. M. CLEMENTS,
BARBARA HERBERT.

Copies of this patent may be obtained for five cents each, by addressing the "Commissioner of Patents, Washington, D. C."